(12) United States Patent
Zhong et al.

(10) Patent No.: US 9,813,019 B2
(45) Date of Patent: Nov. 7, 2017

(54) PHOTOVOLTAIC CONNECTION BOX AND PHOTOVOLTAIC ASSEMBLY

(71) Applicants: Tyco Electronics (Shanghai) Co. Ltd., Shanghai (CN); Tyco Electronics Holdings (Bermuda) No. 7 Limited, Hamilton (BM)

(72) Inventors: Yuan Zhong, Shanghai (CN); Ting Tao, Shanghai (CN); Shih Ying Ko, Taipei (TW)

(73) Assignees: Tyco Electronics Holdings (Bermuda) No. 7 Limited, Hamilton (BM); Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 14/968,073

(22) Filed: Dec. 14, 2015

(65) Prior Publication Data

US 2016/0181972 A1 Jun. 23, 2016

(30) Foreign Application Priority Data

Dec. 17, 2014 (CN) .......................... 2014 1 0783570

(51) Int. Cl.
*H02S 40/34* (2014.01)
*H01R 13/66* (2006.01)
*H01R 13/73* (2006.01)
*H01R 24/60* (2011.01)
*H01R 107/00* (2006.01)

(52) U.S. Cl.
CPC ......... *H02S 40/34* (2014.12); *H01R 13/6641* (2013.01); *H01R 13/73* (2013.01); *H01R 24/60* (2013.01); *H01R 2107/00* (2013.01)

(58) Field of Classification Search
CPC ..... H02S 40/34; H01R 13/6441; H01R 13/73; H01R 24/60; H01R 2107/00
USPC ................................................ 439/620.1, 709
See application file for complete search history.

(56) References Cited

U.S. PATENT DOCUMENTS

| | | | | |
|---|---|---|---|---|
| 6,655,987 B2 * | 12/2003 | Higashikozono | .... | H01R 9/2425 439/535 |
| 7,291,036 B1 * | 11/2007 | Daily | ................. | H05K 7/20445 439/487 |
| 7,833,033 B2 * | 11/2010 | McMahon | .............. | H02S 40/34 439/212 |
| 7,927,132 B1 * | 4/2011 | Lin | ...................... | H01R 4/4809 439/527 |
| 8,137,115 B1 * | 3/2012 | Chou | ....................... | H01R 9/24 136/244 |
| 8,287,300 B2 * | 10/2012 | Yamazaki | ............... | H02S 40/34 439/441 |
| 8,303,349 B2 * | 11/2012 | Shmukler | .......... | H01R 13/2435 439/724 |
| 8,353,725 B2 * | 1/2013 | Ebihara | ................. | H01R 4/185 439/626 |
| 8,366,483 B2 * | 2/2013 | Hardy | .................. | H01R 9/0518 439/578 |
| 8,647,160 B2 * | 2/2014 | Umemoto | ............ | H01R 13/113 439/845 |

(Continued)

*Primary Examiner* — Alexander Gilman
(74) *Attorney, Agent, or Firm* — Barley Snyder

(57) ABSTRACT

A photovoltaic connection box is disclosed. The photovoltaic connection box has a box, a conductive terminal received in the box and having a first lateral wall perpendicular to a bottom of the box, and a diode connected to the first lateral wall.

13 Claims, 4 Drawing Sheets

(56) References Cited

U.S. PATENT DOCUMENTS

| | | | | |
|---|---|---|---|---|
| 8,678,864 B2* | 3/2014 | Yoshikawa | ............. | H02S 40/34 |
| | | | | 439/620.21 |
| 8,737,042 B2* | 5/2014 | Yoshikawa | ............. | H05K 7/20 |
| | | | | 174/549 |
| 8,895,852 B2* | 11/2014 | Sella | ...................... | H02G 3/083 |
| | | | | 174/50 |
| 8,901,731 B2* | 12/2014 | Yamazaki | ............... | H01L 23/32 |
| | | | | 257/698 |
| 8,905,783 B2* | 12/2014 | Umemoto | ........... | H01R 33/965 |
| | | | | 439/274 |

* cited by examiner

PHOTOVOLTAIC CONNECTION BOX AND PHOTOVOLTAIC ASSEMBLY

CROSS-REFERENCE TO RELATED APPLICATIONS

This application claims the benefit of the filing date under 35 U.S.C. §119(a)-(d) of Chinese Patent Application No. 201410783570.2 filed on Dec. 17, 2014.

FIELD OF THE INVENTION

The present invention relates to a photovoltaic connection box installed on a solar panel, and more particularly, to the position of a diode within the photovoltaic connection box.

BACKGROUND

A solar panel (or so called "a solar cell panel") is a device which collects solar energy and converts the solar energy into electric energy. As the electric current produced by each individual solar panel is weak, it is necessary to use a photovoltaic connection box to electrically interconnect a plurality of solar panels so as to converge the electric current for output.

In the prior art, normally the photovoltaic connection box is directly mounted on a corresponding solar panel and is electrically connected with a busbar of the solar panel. A conductive terminal and a diode electrically connected to the conductive terminal are installed in the photovoltaic connection box. The diode is fixed on the horizontal surface of the conductive terminal which is parallel with the solar panel. Such an arrangement positions the diode very close to the solar panel, and as a result, heat created when the diode is operating tends to be transferred to the panels. This heat reduces the power generation efficiency of the solar panels.

Furthermore, in the prior art, as the diode is secured on the horizontal surface of the conductive terminal which is parallel with the solar panel, the conductive terminal needs a relative large horizontal surface to accommodate the diode, resulting in a necessarily larger photovoltaic connection box.

SUMMARY

An object of the invention, among others, is to provide a smaller sized photovoltaic connection box which may prevent the heat created by the diode from being transferred to the solar panel. The disclosed photovoltaic connection box has a box, a conductive terminal received in the box and having a first lateral wall perpendicular to a bottom of the box, and a diode connected to the first lateral wall.

BRIEF DESCRIPTION OF THE DRAWINGS

The invention will now be described by way of example with reference to the accompanying figures, of which.

DETAILED DESCRIPTION OF EMBODIMENT(S)

The invention is explained in greater detail below with reference to embodiments of a photovoltaic connection box. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
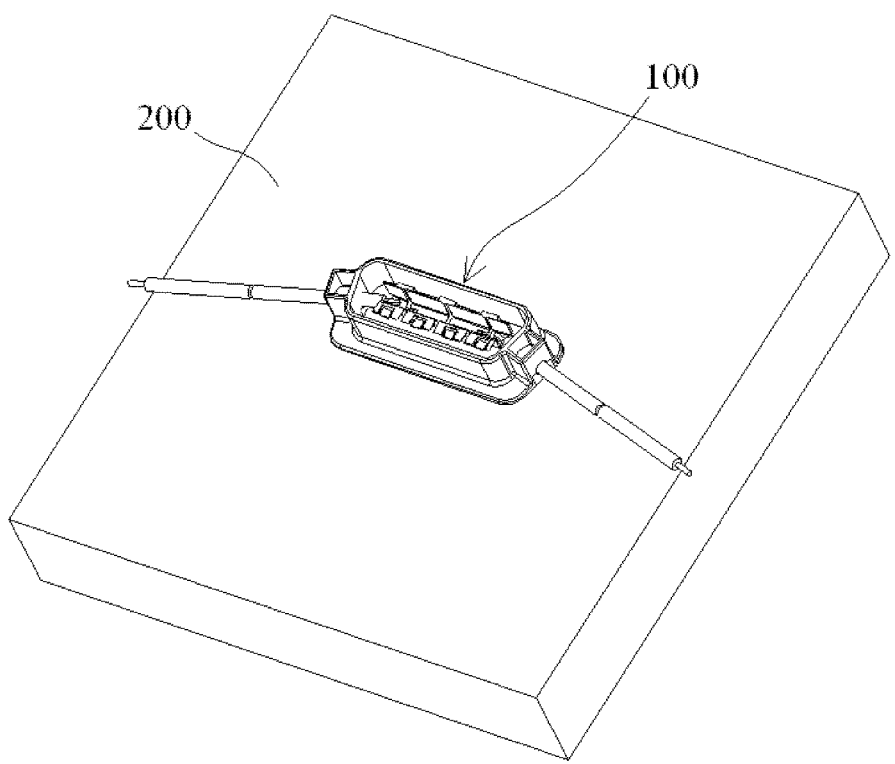
FIG. 1 is a perspective view showing a photovoltaic connection box and a solar panel according to an exemplary embodiment of the present invention.
Figure 2:
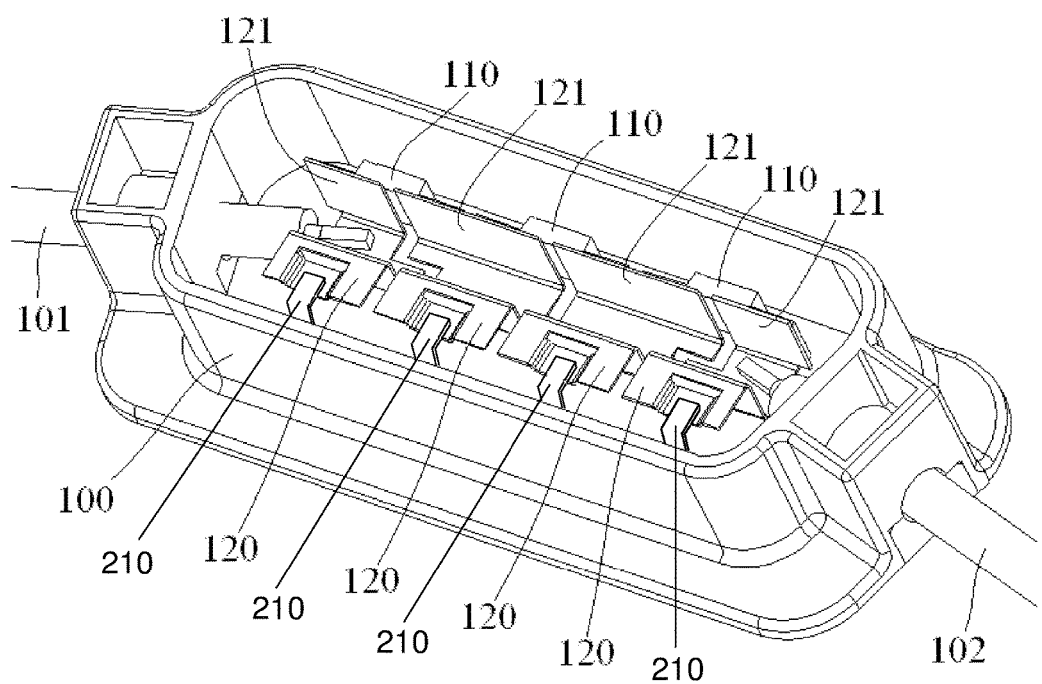
FIG. 2 is an enlarged view of the photovoltaic connection box shown in FIG. 1.

FIG. 1 shows a photovoltaic connection box 100 and a solar panel 200 according to an exemplary embodiment of the present invention. The photovoltaic connection box 100, as shown in FIG. 2, mainly comprises a box, a plurality of conductive terminals 120 received in the box; and a diode 110 installed on the conductive terminals 120. The main components of the invention will now be described in greater detail.

Figure 4:
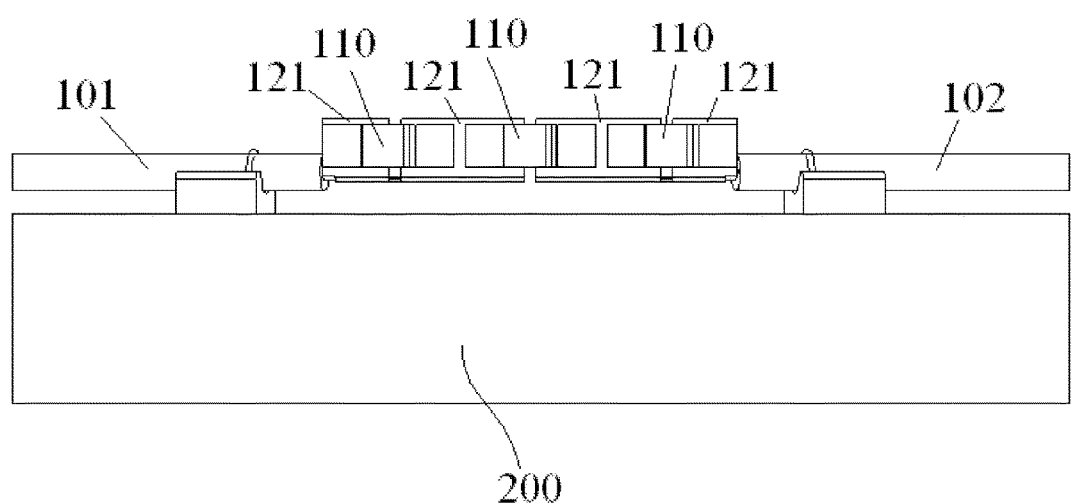
FIG. 4 is a cross-section view of the solar panel and the photovoltaic connection box mounted on the solar panel which is shown in FIG. 1.

The conductive terminal 120, as shown in FIGS. 2 and 4, has a first lateral wall 121 which is perpendicular to the surface of the solar panel 200, and the diode 110 is mounted on the first lateral wall 121 of the conductive terminal 120.

Figure 3:
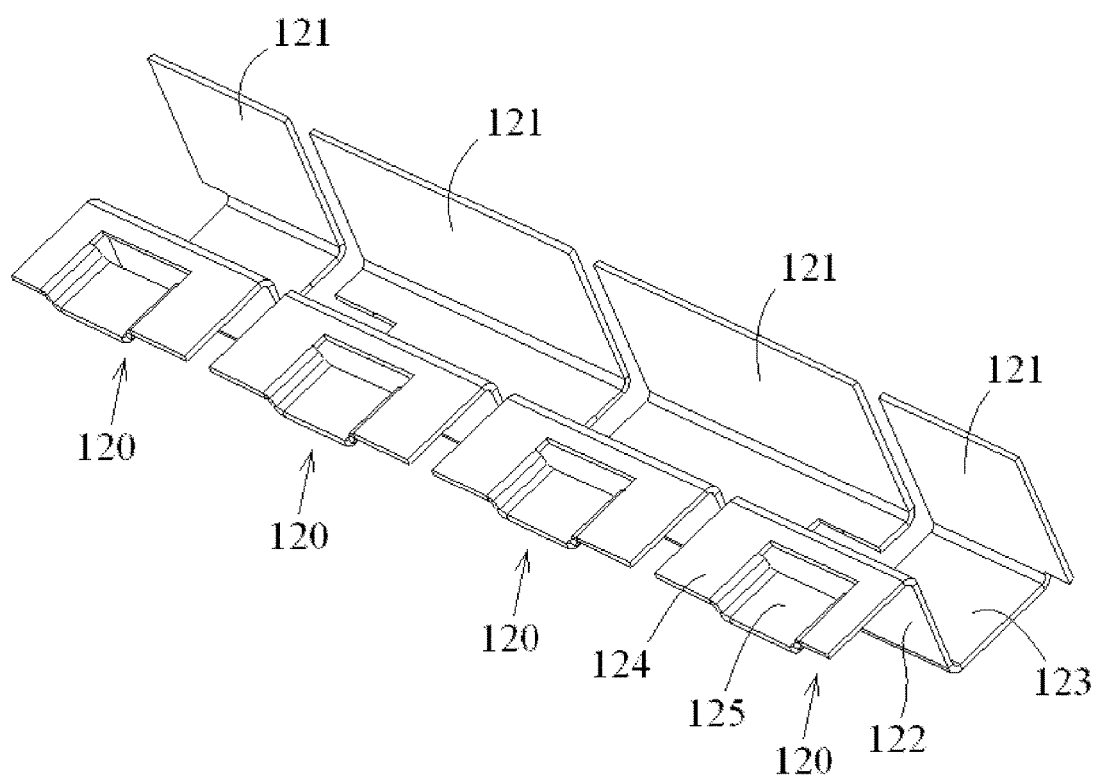
FIG. 3 is an enlarged view of the conductive terminal in the photovoltaic connection box shown in FIG. 2.

As shown in FIG. 3, in an exemplary embodiment of the present invention, the conductive terminal 120 further comprises a bottom wall 123, and a second lateral wall 122 opposite to the first lateral wall 121. The first and second lateral walls 121, 122 are perpendicular to the bottom wall 123 and the bottom of the box, and extend upward vertically from either side of the bottom wall 123, respectively. The conductive terminal 120 further comprises a lateral wing 124 which is perpendicular to the second lateral wall 122 and extends outwards horizontally from the second lateral wall 122. As shown in FIGS. 2 and 3, in an exemplary embodiment of the present invention, a recess 125 is formed on the lateral wing 124, and the recess 125 has a flat bottom surface.

As shown in FIG. 2, in an exemplary embodiment of the present invention, the photovoltaic connection box further comprises a first wire 101 and a second wire 102. The first wire 101 has an end introduced into the box from one end thereof and is electrically connected to the conductive terminal 120. The second wire 102 has an end introduced into the box from the other end thereof and is electrically connected to another conductive terminal 120. In an exemplary embodiment of the present invention, an end of the first wire 101 may be welded or press-fitted to one conductive terminal 120 and an end of the second wire 102 is welded or press-fitted to another conductive terminal 120.

The photovoltaic connection box shown in FIG. 2 has four conductive terminals 120 and three diodes 110, and the four conductive terminals 120 are arranged in a row along the length of the box. One diode 110 is electrically connected between two adjacent conductive terminals 120. The present invention is not limited to the illustrated embodiments; as would be appreciated by one with skill in the art, the photovoltaic connection box may also have two, three, five or more conductive terminals and one, two, four or more diodes.

The diode 110, as shown in FIGS. 2-4, is a chip-type diode which is welded on the outer side of the first lateral wall 121 of the conductive terminal 120 in a manner of surface mounting. The diode 100 may alternatively be welded on the conductive terminal in a manner of dual inline package (DIP).

A photovoltaic assembly is also disclosed. As shown in FIG. 1, it comprises a solar panel 200 and the photovoltaic connection box 100 mentioned above. The photovoltaic connection box 100 is installed on the surface of the solar panel 200 and is electrically connected to the busbar 210 of the solar panel 200 shown in FIG. 2. An end of the busbar 210, as shown in FIG. 2, may be positioned in the recess 125 and welded onto the flat bottom surface of the recess 125 by soldering or resistance welding, such that the busbar 210 can be electrically connected to the conductive terminals 120 securely. As such, a busbar 210 mounted on the solar panel 200 is electrically connected to the lateral wing 124 of the conductive terminal 120, and may be introduced into the photovoltaic connection box 100 from the bottom of the box, as shown in FIG. 2.

In this way, advantageously, the distance between the diode 110 and the solar panel 200 is increased, which may effectively prevent the heat created during operation of the diode 110 from being transferred to the solar panel 200, improving the power generation efficiency of the solar panel. Further, as the diode 110 is installed on a vertical lateral wall 121 of the conductive terminal 120 which is perpendicular to the solar panel 200, the conductive terminal does not need a relative large horizontal surface, which substantially reduces the required length and width of the photovoltaic connection box 100. Because the photovoltaic connection box 100 has a small width and length, it can be adapted to various solar panels types, such as a monocrystalline silicon solar panel, a polycrystalline silicon solar panels, a thin-film solar panels and a double-wave photovoltaic panel.

What is claimed is:

1. A photovoltaic connection box, comprising:
   a box having a bottom;
   a conductive terminal received in the box and having a first lateral wall, a bottom wall, a second lateral wall opposite to the first lateral wall, the first and second lateral walls are perpendicular to the bottom wall and extend upward vertically from either side of the bottom wall, and a lateral wing extending outward horizontally from the second lateral wall and in a direction away from the bottom wall; and
   a diode connected to the first lateral wall.

2. The photovoltaic connection box of claim 1, wherein the lateral wing extends perpendicular to the second lateral wall.

3. The photovoltaic connection box of claim 2, wherein a busbar is electrically connected to the lateral wing.

4. The photovoltaic connection box of claim 3, wherein the busbar is introduced into the photovoltaic connection box from the bottom of the box.

5. The photovoltaic connection box of claim 4, wherein the lateral wing has a recess with a flat bottom surface, and an end of the busbar is positioned in the recess and welded onto the flat bottom surface.

6. The photovoltaic connection box of claim 1, further comprising a plurality of conductive terminals.

7. The photovoltaic connection box of claim 6, further comprising a first wire introduced into the box from one end thereof and electrically connected to one conductive terminal, and a second wire introduced into the box from the other end thereof and electrically connected to another conductive terminal.

8. The photovoltaic connection box of claim 7, wherein the first and second wires are welded or press-fitted to the respective conductive terminals.

9. The photovoltaic connection box of claim 6, wherein one diode is electrically connected between two adjacent conductive terminals.

10. The photovoltaic connection box of claim 9, wherein the photovoltaic connection box has four conductive terminals and three diodes, the four conductive terminals arranged in a row along the length of the box.

11. The photovoltaic connection box of claim 1, wherein the diode is a chip-type diode.

12. The photovoltaic connection box of claim 11, wherein the diode is welded on an outer surface of the first lateral wall in a manner of surface mounting.

13. A photovoltaic connection box, comprising:
    a box having a bottom;
    a conductive terminal received in the box and having a first lateral wall, a bottom wall, a second lateral wall opposite to the first lateral wall, the first and second lateral walls extending upward vertically from either side of the bottom wall, and a lateral wing extending outward horizontally from the second lateral wall and perpendicular to the second lateral wall, the lateral wing having a recess with a flat bottom surface;
    a diode connected to the first lateral wall; and
    a busbar electrically connected to the lateral wing, an end of the busbar positioned in the recess and welded onto the flat bottom surface.

* * * * *